United States Patent [19]

Qureshi

[11] 4,455,661
[45] Jun. 19, 1984

[54] DUAL PROCESSOR DIGITAL MODEM APPARATUS

[75] Inventor: Shahid U. H. Qureshi, Natick, Mass.

[73] Assignee: Codex Corporation, Mansfield, Mass.

[21] Appl. No.: 503,577

[22] Filed: Jun. 13, 1983

Related U.S. Application Data

[63] Continuation of Ser. No. 136,920, Apr. 3, 1980, abandoned.

[51] Int. Cl.$^3$ .............................................. H04B 1/38
[52] U.S. Cl. ...................................... 375/8; 375/121; 179/3; 364/200; 364/900
[58] Field of Search ................... 375/8, 11, 12, 13, 14, 375/121; 179/2 DP, 3, 4; 333/18; 364/200 MS File, 900 MS File; 329/50, 110

[56] References Cited

U.S. PATENT DOCUMENTS

| | | | |
|---|---|---|---|
| 3,889,237 | 6/1975 | Alferness | 364/200 |
| 3,902,165 | 8/1975 | Artom | 364/900 |
| 3,908,169 | 9/1975 | Tong | 375/76 |
| 4,071,827 | 1/1978 | Koike | 375/12 |
| 4,085,449 | 4/1978 | Walsh et al. | 364/900 |
| 4,181,936 | 1/1980 | Kober | 364/200 |

OTHER PUBLICATIONS

Bulyanov et al., "Digital Modems For VF Channels", Dec. 1978, Telecommunication & Radio Eng. Part, (USA), pp. 29-33.

*Primary Examiner*—Robert L. Griffin
*Assistant Examiner*—Stephen Chin

[57] ABSTRACT

Modem apparatus in which a modulated carrier signal represents digital bits, wherein the apparatus includes first digital processing circuitry having first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing the modulated carrier signal, where T represents the duration of a modulation period of the carrier signal, first bus circuitry connected to the first programmable digital circuitry for carrying the digital values and the arithmetic program instructions, and first memory circuitry connected to the first bus circuitry for storing the instructions, digital values, and signal values; second digital processing circuitry comprising second programmable digital circuitry for generating control signals corresponding to predetermined sequences of the arithmetic instructions, second bus circuitry connected to the second programmable circuitry for carrying the control signals, and second memory circuitry connected to the second bus circuitry for storing control signal program instructions; timing circuitry for timing the operation of the first and second processing circuitries, and means for providing a sequence of time-limited handshakes between the first and second processing circuitries, during which the control signals are transferred to the first processing circuitry to cause the first programmable digital circuitry to carry out the predetermined sequences of the arithmetic instructions.

13 Claims, 11 Drawing Figures

DUAL PROCESSOR DIGITAL MODEM APPARATUS

This application is a continuation of application Ser. No. 136,920, filed 4/3/80 now abandoned.

BACKGROUND OF THE INVENTION

This invention relates to modem apparatus in which a modulated carrier signal represents digital bits.

Recently, efforts have been made to use programmable microprocessing circuitry to carry out certain modem functions, e.g., as described in Walsh et al. U.S. Pat. No. 4,085,449.

SUMMARY OF THE INVENTION

The invention provides improved microprocessor based modem circuitry, useful for reception and, in certain aspects, for transmission of modulated carrier signals. Excellent operation and efficiency are achieved at a low cost.

In one aspect, the invention features first processing circuitry having first programmable digital circuitry for arithmetic manipulation of digital values to produce a correspondence between a sequence of signal values and a modulated carrier signal, first bus circuitry for carrying the digital values and arithmetic program instructions, and first memory circuitry for storing the instructions, digital values, and signal values; second digital processing circuitry having second programmable digital circuitry for generating control signals corresponding to predetermined sequences of the arithmetic instructions, second bus circuitry for carrying the control signals, and second memory circuitry for storing control signal program instructions; timing circuitry for timing the operation of the first and second processing circuitries; and means for providing a sequence of time-limited handshakes between the first and second processing circuitries, during which the control signals are transferred to the second processing circuitry.

In another aspect of the invention, the second processing circuitry has second programmable digital circuitry for producing a correspondence between the signal values, and bit values representing those signal values, second bus circuitry for carrying the signal values, and second memory circuitry for storing a table of correspondence between the signal values and the bit values.

In preferred embodiments, the second processing circuitry includes means for responding to condition signals generated by a source external to the modem apparatus, or to a carrier level signal generated internally by the modem, to select a particular control signal for transfer to the first processing circuitry during a succeeding handshake, e.g., to cause the modem to enter a set-up mode after carrier detect; the processing circuitries operate simultaneously and independently of each other except during the handshakes; one of the processing circuitries includes means for interrupting the operation of the other to initiate a handshake; the first bus circuitry includes separate data and instruction buses and the first memory includes separate data and instruction memories to enable the transfer of the arithmetic program instructions during the arithmetic manipulation; the first programmable digital circuitry includes means for repeatedly manipulating in a predetermined order a successively produced sequence of the digital values wherein the manipulating means includes storage means for storing the sequence of digital values, means for replacing the most ancient digital value in its memory position with a new digital value without changing the memory positions of the digital values, and means for repeatedly addressing the memory positions in the predetermined order by changing the initially addressed position for each of the repeated manipulations; the first processing circuitry further includes means for performing arithmetic operations and data transfer simultaneously; the first processing circuitry further includes carrier loss means for determining when the average level of the received modulated carrier signal falls below a predetermined threshold; the first processing circuitry further includes means for computing the value of a carrier gain adjustment signal, the modem apparatus further includes data sampling means for sampling the received modulated carrier signal at successive instances of time to derive the digital bits, and the first processing circuitry further includes timing recovery means for controlling the selection of the instants of time; the timing recovery means further includes means for generating in error signal which is transferred to the second processing circuitry during a handshake and becomes the basis upon which the second processing circuitry selects the instants of time; the first processing circuitry further includes equalizer means for changing the amplitude versus time characteristics of the received carrier signal.

Other advantages and features will appear from the following description of the preferred embodiment, and in the claims.

DESCRIPTION OF THE PREFERRED EMBODIMENT

We first briefly describe the drawings.

DRAWINGS

STRUCTURE

Figure 1:
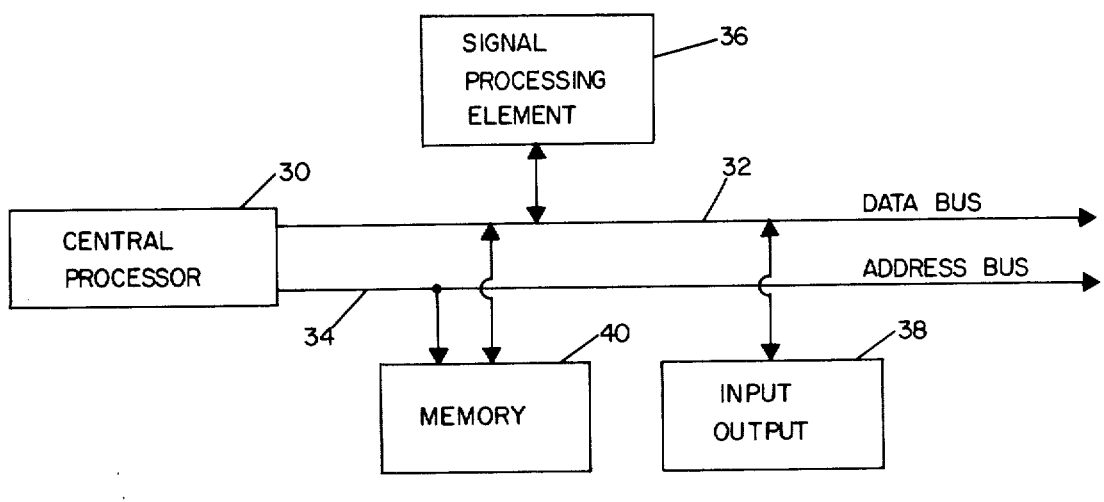
FIG. 1 is a general block diagram of a receiver embodying the invention.

Referring to FIG. 1, the receiver has a central microprocessor (MPU) 30 (the Motorola 68B00 general purpose microprocessor chip), connected to data bus 32 and address bus 34. Signal processor element (SPE) 36 and input/output circuitry 38 are also connected to bus 32. MPU memory 40 is connected to both buses.

Figure 2:
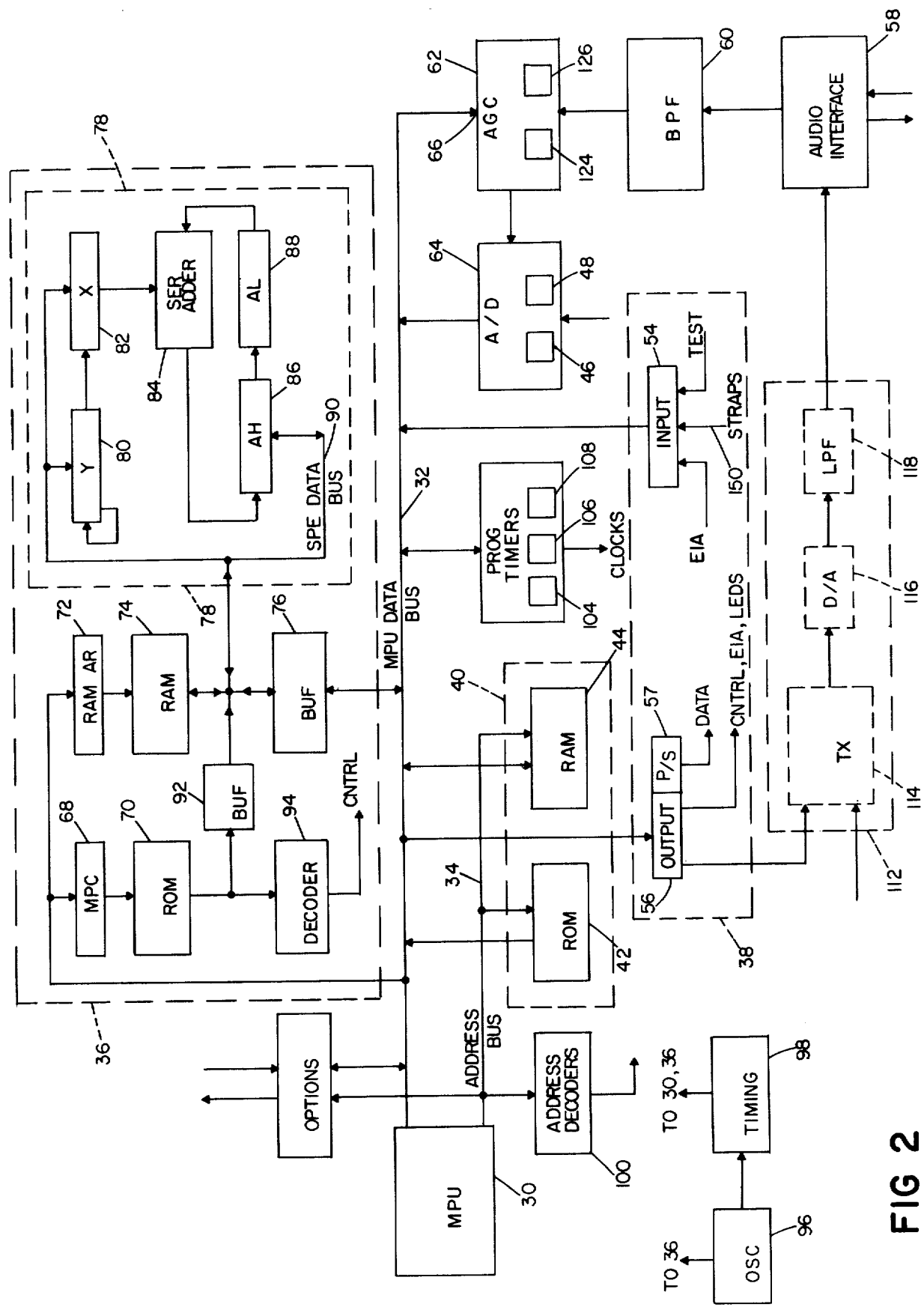
FIG. 2 is a more detailed block diagram of the receiver.

Referring now to FIG. 2, MPU 30 has a 4K×8 bit ROM program memory 42, from which MPU 30 executes instructions, and a 256×8 bit RAM data memory 44. MPU 30 interfaces with conventional data terminal equipment and the modem front panel (straps, test switches, indicators, and the like), through input and output registers 54 and 56.

Audio interface 58, band pass filter 60, AGC element 62, and A/D converter 64 are arranged to initially process received signals and put them on data bus 32. Bus 32 also has a control connection 66 directly to element 62.

Converter 64 has a sample-and-hold circuit 46 clocked at 7200 samples/sec., and an 8 bit A/D element 48.

AGC element 62 consists of an 8 bit latch 124 connected to multiplying D/A converter 126. Latch 124 is arranged to receive a coarse gain control signal g from MPU 30, once during each symbol interval and to pass g to multiplying D/A converter 126, thus producing an output voltage $v_{out}$ proportional to the product of g and input voltage $v_{in}$.

SPE 36 is an independent, programmable digital processor which is loosely coupled to, and executes tasks under the control of, MPU 30. Three elements of SPE 36 are connected to data bus 32: microprogram counter (MPC) 68, which can be loaded by MPU 30 and determines the next instruction address in 1K×8 bit ROM program memory 70 for SPE 36; random access memory address register (RAM AR) 72, which can also be loaded by MPU 30 and points to the operand in 256×8 bit data memory 74; and 8 bit read/write buffer 76, through which MPU 30 and SPE 36 can exchange data.

Arithmetic unit 78, in SPE 36, has two 8 bit registers, Y register 80 and X register 82; a serial adder 84 which can receive, in sequence, the data stored in X register 82; and two bit 8 accumulators, "high" accumulator AH 86 which stores the 8 most significant bits of a 16 bit number and "low" accumulator AL 88 which stores the remaining 8 bits. Y register 80, X register 82, and AH 86 are all connected through SPE data bus 90 to SPE data memory 74, read/write buffer 76, and intermediate buffer 92. Intermediate buffer 92 is in turn connected to SPE program memory 70.

SPE 36 also has an instruction register decoder 94 connected to SPE program memory 70.

Crystal oscillator 96 generates a 7.3728 MHz clock signal which is provided to SPE 36 and to frequency division circuitry 98. The output of frequency division circuitry 98 is a 1.8432 MHz clock signal which is provided to MPU 30.

Address decoders 100 connect with all components connected to MPU data bus 32.

Three programmable timers 104, 106, and 108 are provided. Timer 104 is frequency controlled by MPU 30 and generates an adjusted clock from which a sample clock signal for A/D converter 64 as well as a receive bit-rate clock signal for the terminal are derived. Timer 106, also frequency controlled by MPU 30, generates and supplies to MPU 30 a software timing clock. Timer 108 is in communication only with MPU 30, can be reset to a predetermined time interval by MPU 30, and serves a "watchdog" function described below.

Shown in phantom in FIG. 2 are elements that participate in the modem transmitters: LSI transmitter chip (e.g., Motorola Part Number 6862) 114, D/A converter 116, and low pass filter 118, connected between output register 56 and audio interface 58.

Figure 3:
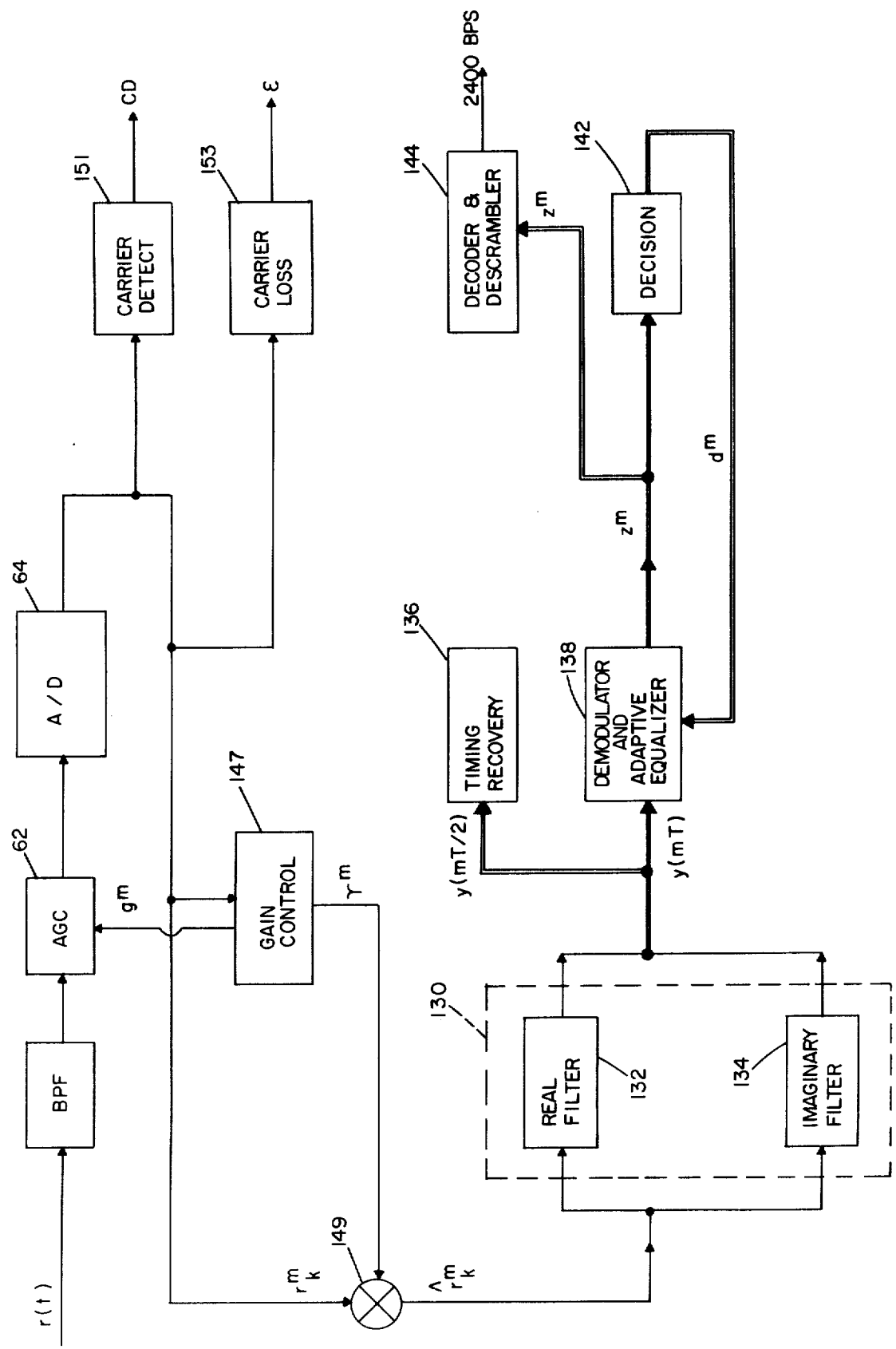
FIG. 3 is a block diagram illustrating procedures carried out by microprocessor circuitry in the receiver.

MPU 30 and SPE 36 are programmed to effect the further modem "circuits" shown generally in FIG. 3. In particular, there is effected a non-recursive, digital, phase splitting "filter" 130, with real and imaginary parts 132 and 134, which receives the output of A/D converter 64, after scaling via "multiplier" 149, and provides filtered outputs to timing recovery "circuit" 136 (at 2400 samples/sec., twice the baud rate) and to demodulation and adaptive equalization circuitry 138 (at 1200 samples/sec., the baud rate). The demodulated and equalized signal $z^m$ is passed to decision "circuit" 142, which in turn feeds "decoder/descrambler" 144 to provide a 2400 bps digital output. The output $d^m$ of decision circuit 142 is provided to circuit 138 for use in adjusting the demodulator carrier phase and frequency and updating the adaptive equalizer coefficients.

Gain control "circuit" 147, depending on the strength of signals received from converter 64, provides coarse gain control factor g to AGC element 62 and fine gain control factor $\gamma$ to multiplier 149, located within SPE 36. Carrier detect "circuit" 151 and carrier loss "circuit" 153 monitor the strength of signals from converter 64 to determine if a data transmission has begun or terminated.

Further details of how MPU 30 and SPE 36 effect these modem "circuits" and their functions will appear in the following description of the receiver operation.

OPERATION

In general, the modem, while on line, monitors the average strength of the signal samples produced by A/D converter 64 at a rate of 7,200 times per second. When a preselected threshold strength is exceeded, MPU 30 raises a carrier detect condition and sets an initial gain factor g for AGC 62. With carrier detected and gain initialized, the receiver enters a timing jam mode in which one out of six consecutive samples produced by A/D converter 64 is selected by MPU 30 for equalization and demodulation. Thereafter the tap coefficients of the equalizer are set to initial values.

The above steps completed, the receiver enters a data mode, wherein the AGC, timing rate, carrier phase, and equalizer tap coefficients are continually updated. The average signal strength is also continually computed, when it falls below a preselected carrier-off threshold, a carrier loss signal is raised, taking the modem out of data mode.

We turn first to a description of the receiver's operation in the data mode, assuming that the carrier detect, gain initialization, timing jam, and equalizer initialization functions have been previously carried out by the receiver. Thereafter, will follow a description of the start up procedure.

A/D converter 64 samples the incoming, band pass filtered, and gain adjusted analog signal r(t), at a rate of 7,200 samples/sec. (i.e., six times the baud rate), and outputs the samples, one at a time, to MPU 30, where each set of six samples is stored, time ordered, in a six sample buffer 270 (shown in FIGS. 10 and 11) implemented by software.

With timing jam and timing recovery properly implemented (both functions are described below), the sixth cell of buffer 270 will contain the sample ultimately to be used for demodulation. This sample, along with five prior samples, will fill buffer 270, at which point the six samples will be sequentially transferred to SPE 36, via read/write buffer 76, beginning with the sample contained in the first buffer unit.

SPE 36 multiplies the six transferred samples by fine gain control factor $\gamma$ and enters them, in the order of their reception, into the first six units of a 21 unit delay line 284, implemented by software, wherein each unit of delay is 1/7200 sec. Based on the current contents of 21 unit delay line 284, SPE 36 now computes the output of filter 130 twice each modulation period (i.e., for the mth period, at times mT and mT−T/2 where T is 1/1200 sec.) as follows.

To compute the output of filter 130 for any given time SPE 36 begins with the sample $\hat{r}$ contained in the delay unit occupying that time slot, fetches from memory the filter coefficient corresponding to that time slot, and multiplies the two together in arithmetic unit 78, accumulating the resultant product in AH 86 and AL 88. This process is repeated for each of the 17 next most ancient samples $\hat{r}$ contained in the next 17 delay units, the final summation of the products being accumulated in AH 86 and AL 88. Thus, to compute the output of filter 130 at time mT, SPE 36 begins computations at the first delay unit and proceeds through to the eighteenth, and, to compute the output of filter 130 at time mT−T/2, SPE 36 begins computations at the third delay unit and proceeds through to the twenty-first. In either case, the computation spans 18 time slots.

The two filter outputs thus produced are designated the main sample y(mT) and the timing sample y(mT−T/2).

The kth coefficient of filter 130, for k=0, 1, ... 17, is:

$$p(kT/6) = \hat{p}(kT/6)\exp(j2\pi f_c kT/6)$$

where $\hat{p}(kT/6)$ is the corresponding coefficient for the more conventional post-demodulator low pass filter.

The carrier frequency is $f_c = 3/2T$. So long as $f_c = n(3/2T)$, where n is an integer, then, if $\hat{p}(kT/6)$ are real, the even numbered coefficients p(kT/6), k=0, 2, 4, ..., are real and the odd numbered coefficients p(kT/6), k=1, 3, 5, ..., are imaginary. Thus, the workload of computing the output of filter 130 is reduced by one half. More generally if $f_c = nf_s/4m$, where n and m are integers, and $f_s$ is the sampling frequency (in this case $f_s = 6/T$), then the saving in the workload for computing the filter output is $\frac{1}{2}$m.

Since filtering is done at passband, as opposed to structures in which quadrature demodulation is followed by low pass filtering, the amplitude response of filter 130 need not have even symmetry and the phase response of filter 130 need not have odd symmetry. Thus, by appropriate choice of the coefficients p(kT/6), compromise equalization may be effected, if desired.

Memory 70 contains two sets of coefficients p(kT/6), one for providing and one for not providing compromise equalization. Choice of which set of filter coefficients SPE 36 applies is selectable via input register 54.

The main sample output of filter 130 (i.e., y(mT)) subsequently passes first to conventional demodulator and equalizer circuitry 138, and then to decision circuit 142.

Demodulation and equalization of the complex output of filter 130 may be implemented in a variety of ways well-known in the art. The demodulator or phase corrector may precede or follow the equalizer. P. J. Van Gerwen, N. A. M. Verhoeckx, H. A. Van Essen and F. A. M. Snijders, "Microprocessor Implementation of High Speed Data Modems," *IEEE Transactions on Communications*, Vol. COM-25, No. 2, February, 1977, pp. 238-250 teaches phase splitting filtering followed by demodulation. A review of prior equalization art for complex valued signals is Proakis and Miller *IEEE Transactions for Information Theory*, Volume IT-15, No. 4, July 1969. Equalization for a QAM receiver is also described in U.S. Pat. No. 4,084,226. A method of phase correction following equalization is described in U.S. Pat. No. 4,027,250.

The output of decision circuit 142 is a signal $d^m$, representing the phase of the demodulated and equalized signal $z^m$ as being within the boundaries of one of the four quadrants of the complex plane.

The output $d^m$ of decision circuit 142 is fed back to circuitry 138, for use in adjusting the demodulating carrier phase and frequency and updating the equalizer tap coefficients.

Decoder and descrambler circuit 144 of FIG. 3 is embodied in a number of routines within MPU program memory 42, the routine chosen depending on the compatibility mode being used. During the handshake between MPU 30 and SPE 36, signal $z^m$, the output of demodulator and equalizer 138, is sent to MPU 30, which uses it to independently produce ideal decision vector $d^m$, which is then decoded to yield a dibit of data. The repeated dibits are descrambled according to the reverse of the scrambler program used.

As MPU 30 decodes and descrambles the dibits forming the data message, it stores them in a block of memory 44. After a predetermined number of dibits have been decoded and stored in memory 44, MPU 30 transfers them, sequentially, to a two bit parallel-to-serial converter circuit 57, located within output register 56.

The rate of bit transfer from MPU 30 to the terminal (not shown) is selectably controllable by either a receive bit-rate clock, derived from the adjusted clock provided by timer 104, or by an independent clock supplied by the terminal. In the latter case, the dibits stored in memory 44 provide an "elastic buffer" to compensate for drifts and/or jitter between the rates at which dibits are being decoded and descrambled by MPU 30 and the external clock provided by the terminal. During data transfer from MPU 30 to the terminal, a flag is raised whenever converter circuit 57 is empty, indicating that any dibit previously placed there has been transferred to the terminal. MPU 30 examines the flag, via input register 54, a short intervals during data transfer and transfers a new dibit from memory 44 to converter circuit 57, whenever the flag is in a raised condition.

The modem has a Bell 201-compatible mode in which the data is not scrambled and descrambled. In this mode, equalizer 138 may develop arbitrary coefficients in the presence of long strings of repetitive dibits. Rather than allow the coefficients to wander in this condition, it is preferable to freeze them at whatever value they have when periodicity is detected.

Figure 4:
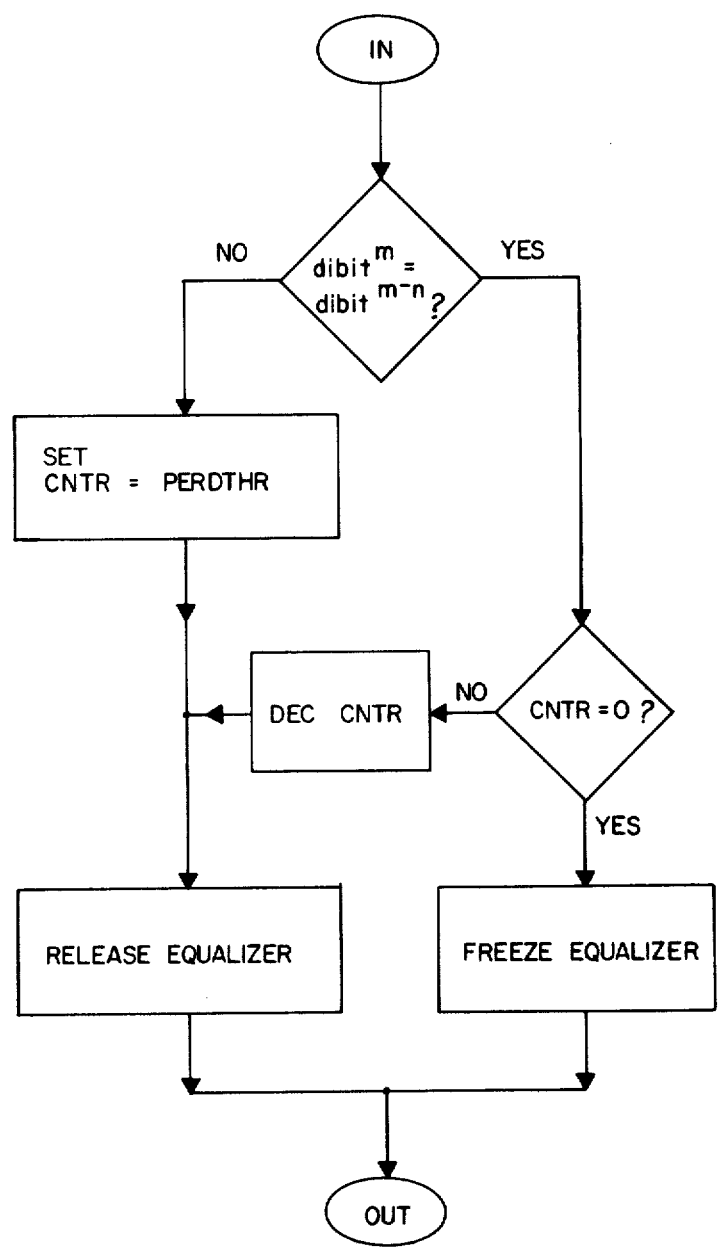
FIG. 4 is a flow chart of an equalizer freeze procedure carried out by microprocessor circuitry in the receiver.

The receiver accomplishes this by implementing an equalizer freeze algorithm shown in flow chart form in FIG. 4. Each symbol period the decoded dibit corresponding to $d^m$ is compared for identity to the earlier decoded dibit corresponding to $d^{m-n}$. If the earlier and later dibits are nonidentical, a counter in memory 44 is set to PERDTHR (i.e., the periodicity threshold which is the number of repeated dibits at which it is desired to freeze the equalizer coefficients) and a "release equalizer" signal is sent to SPE 36. If the earlier and later dibits are identical the counter is then tested for equality to zero. If the value of the counter is nonzero, the counter is decremented and a "release equalizer" signal is sent to SPE 36, but, if the value of the counter is zero, a "freeze equalizer" signal is sent to SPE 36.

The constant n, here 4, should, in general, be no greater than the number of taps in equalizer 138.

Figure 5:
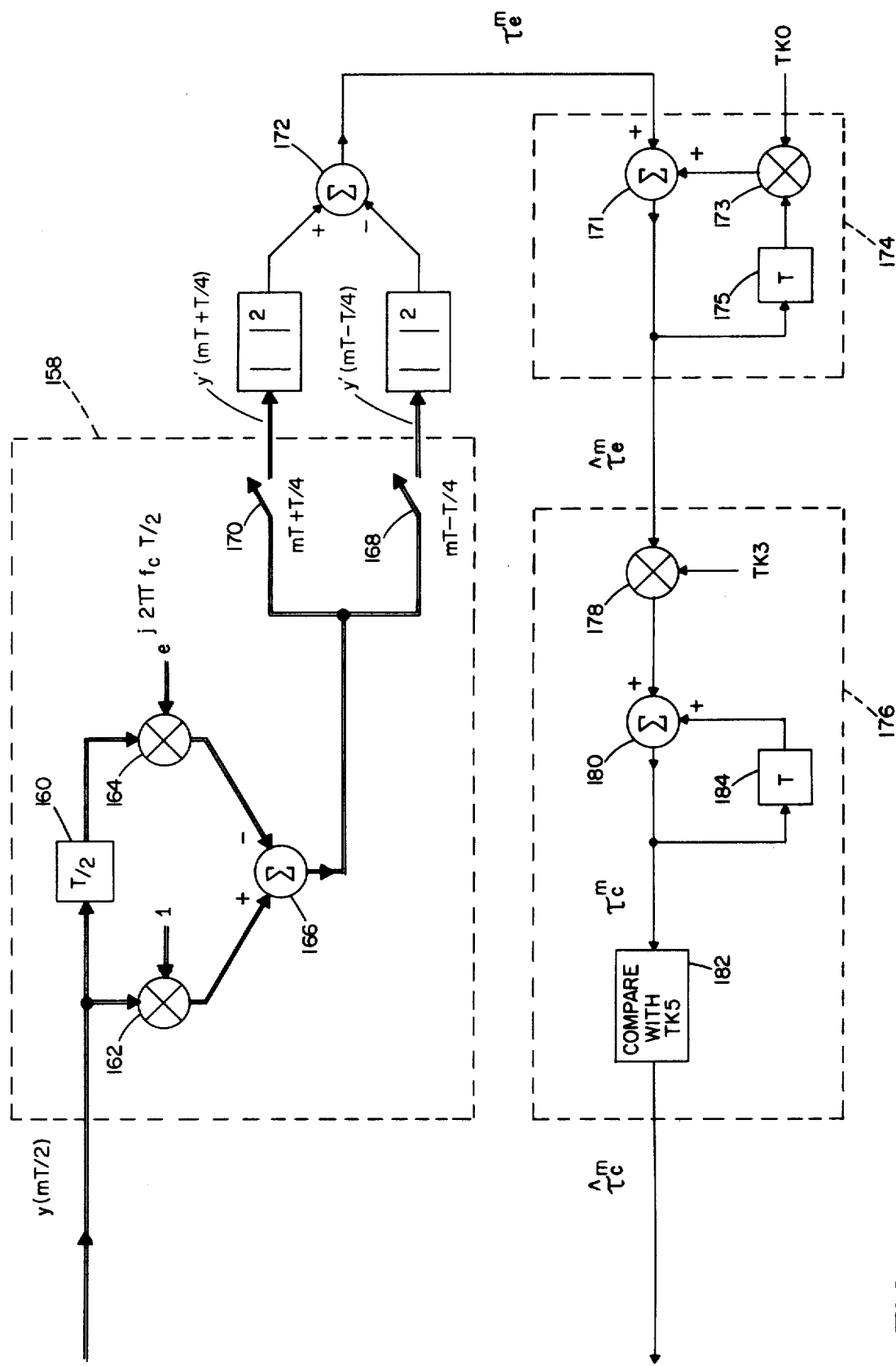
FIG. 5 is a block diagram of a timing recovery procedure carried out by microprocessor circuitry in the receiver.

The input to timing recovery circuit 136 of FIG. 3, shown in more detailed block diagram format in FIG. 5, is, alternately, the main sample output y(m/T) of filter 130 and the timing sample output y(mT−T/2) of filter 130. Its input sample rate is thus 2400 samples per sec.

Samples y(mT/2) are passed through prefilter 158, made up of T/2 delay 160, multiplication elements 162 and 164, and summation element 166.

Prefilter 158 has a flat group delay of T/4 seconds and an amplitude characteristic of $|\sin[\pi(f-f_c)T/2]|$. Its output is denoted as y'(mT±T/4). The delay introduced by prefilter 158 is depicted figuratively in FIG. 5 as samplers 168 and 170, having sampling times of (mT±T/4).

The frequency response of prefilter 158 has zero response at the carrier frequency $f_c$, which carries no timing information. The prefilter gain increases with $|f-f_c|$, enhancing signals which carry more timing information, such as $f_c \pm \frac{1}{4}T$ and $f_c \pm \frac{3}{4}T$. As a result, low level timing information, resulting from repeated "00" and "10" dibits in the coding specified by C.C.I.T.T. V.26B (or Bell 201) mode, is not rejected.

Timing error $\tau_e^m$, the output of summation element 172, is equal to the difference of the squares of the complex magnitudes of y' (mT+T/4) and y'(mT−T/4). The squared magnitude of y'(mT+T/4) and y'(mT−T/4) are early and late samples of a DC component and a sinusoidal component of frequency R (i.e., they "straddle" a peak of the resultant sinusoidal waveform), where R is the symbol rate.

Timing error $\tau_e^m$ is passed through first-order, digital recursive filter 174 to remove noise and provide some averaging over time. Filter 174 is made up of adder 171, multiplier 173, and T delay 175. Its output is:

$$\hat{\tau}_e^m = TKO\hat{\tau}_e^{m-1} + \tau_e^m$$

where TKO is a constant of $\frac{3}{4}$, which yields a time constant of about 4 symbols.

Rather than adjust the sampling instant whenever $\hat{\tau}_e^m$ is nonzero, it is preferable to accumulate the filtered timing error and adjust only when the accumulated error exceeds a preselected threshold. By doing so, small jitter variations around the point of zero timing error are ignored. To this end is provided accumulator circuit 176, consisting of multiplier 178, summation element 180, multiplier 182, and T delay 184.

The process carried out by accumulator circuit 304 can be represented by:

$$\tau_c^m = \tau_c^{m-1} = TK3 \hat{\tau}_e^m$$

where TK3 is a scaling constant.

$\tau_c^m$, the accumulated timing error, is compared, once each symbol period, to a threshold, TK5. $\tau_c^m$, a signal sent to MPU 30 once each symbol period, has a value of 1 if $\tau_c^m \geq TK5$, −1 if $\tau_c^m \leq -TK5$, and 0 otherwise.

The value of $\hat{\tau}_c^m$ becomes the basis upon which MPU 30 decides whether or not to alter timer 104. In particular, whenever $\hat{\tau}_c^m$ is nonzero, MPU 30 alters timer 104, such that sampling time of sample and hold circuit 46 is changed by T/768, depending on the sign of $\hat{\tau}_c^m$. Whenever $\hat{\tau}_c^m$ is nonzero, SPE 36 also resets $\tau_c^m$ to zero.

Once each symbol period, gain control algorithm circuit 147 of FIG. 3 outputs the two updated gain control factors; coarse gain control factor g, sent to AGC 62, determines the gain applied to the analog signal r(t) input to A/D converter 64, while fine gain control factor $\gamma$, sent to SPE 36, determines the gain applied to the $r_k^m$ input to filter 130. The particular updated values of g and $\gamma$ are determined as follows.

MPU 30, besides buffering each incoming $r_k^m$ input from A/D converter 64, also computes and accumulates the value of $|r_k^m|/4$. Thus, at the end of any six-sample baud, MPU 30 has available, in memory, the sum:

$$\sum_{k=0}^{5} |r_k^m|/4.$$

Figure 6:
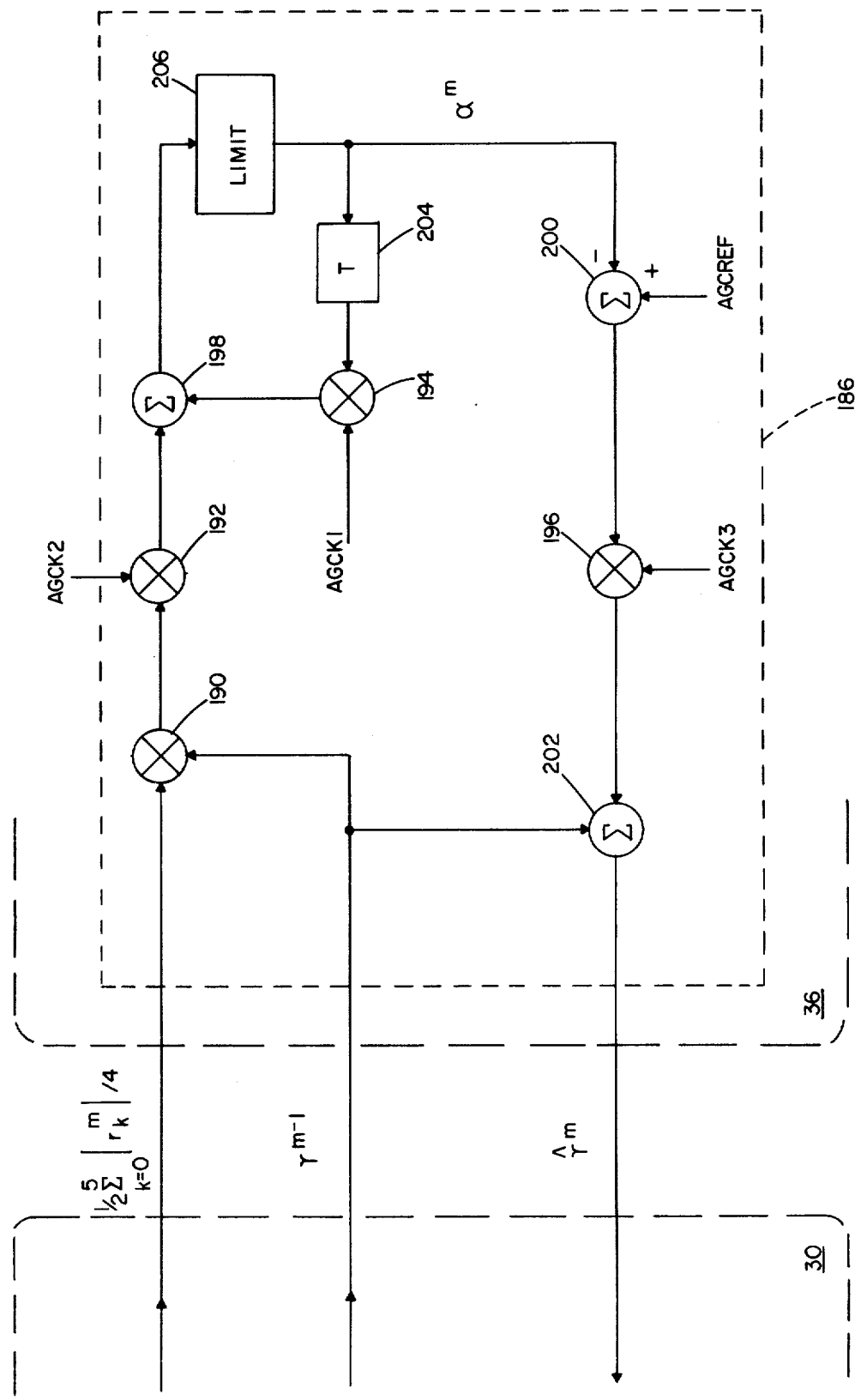
FIG. 6 is a block diagram of a procedure carried out by microprocessor circuitry in the receiver, to determine a tenative fine gain control factor.

Prior to each handshake operation, MPU 30 halves this accumulated sum by shifting one bit and sends the halved, accumulated sum, along with $\hat{\gamma}^{m-1}$ (the fine gain factor applied during the previous symbol period), to SPE 36, which then computes a tentative fine gain control factor, $\gamma^m$, according to the digital filtering operation shown in FIG. 6.

Digital filter 186 of FIG. 6 consists of: multipliers 190, 192, 194, and 196; adders 198, 200, and 202; T delay unit 204; and limiter 206. It has inputs $$\left(\frac{1}{2} \sum_{k=0}^{5} |r_k^m|/4\right)$$

and $\gamma^{m-1}$, both sent by MPU 30, and outputs $\hat{\gamma}^m$ to MPU 30. The output of filter 186 is:

$$\hat{\gamma}^m = \gamma^{m-1} = AGCK3 \ (AGCREF - \alpha^m),$$

where $$\alpha^m = AGCK1 \ \alpha^{m-1} + AGCK2 \ \gamma^{m-1} \left(\frac{1}{2} \sum_{k=0}^{5} |r_k^{m-1}|/4\right).$$

Limiter 206 serves the function of preventing $\alpha^m$, the average signal magnitude, from overflowing. AGCK1 provides a time constant of 16 symbols. Use of a 16 symbol time constant allows both some averaging over data dependent signal strength variations and reasonably fast response to gain hits.

AGCREF is the desired value of $\alpha$, and AGCK3 is a constant which determines the speed of gain adjustment.

Figure 7:
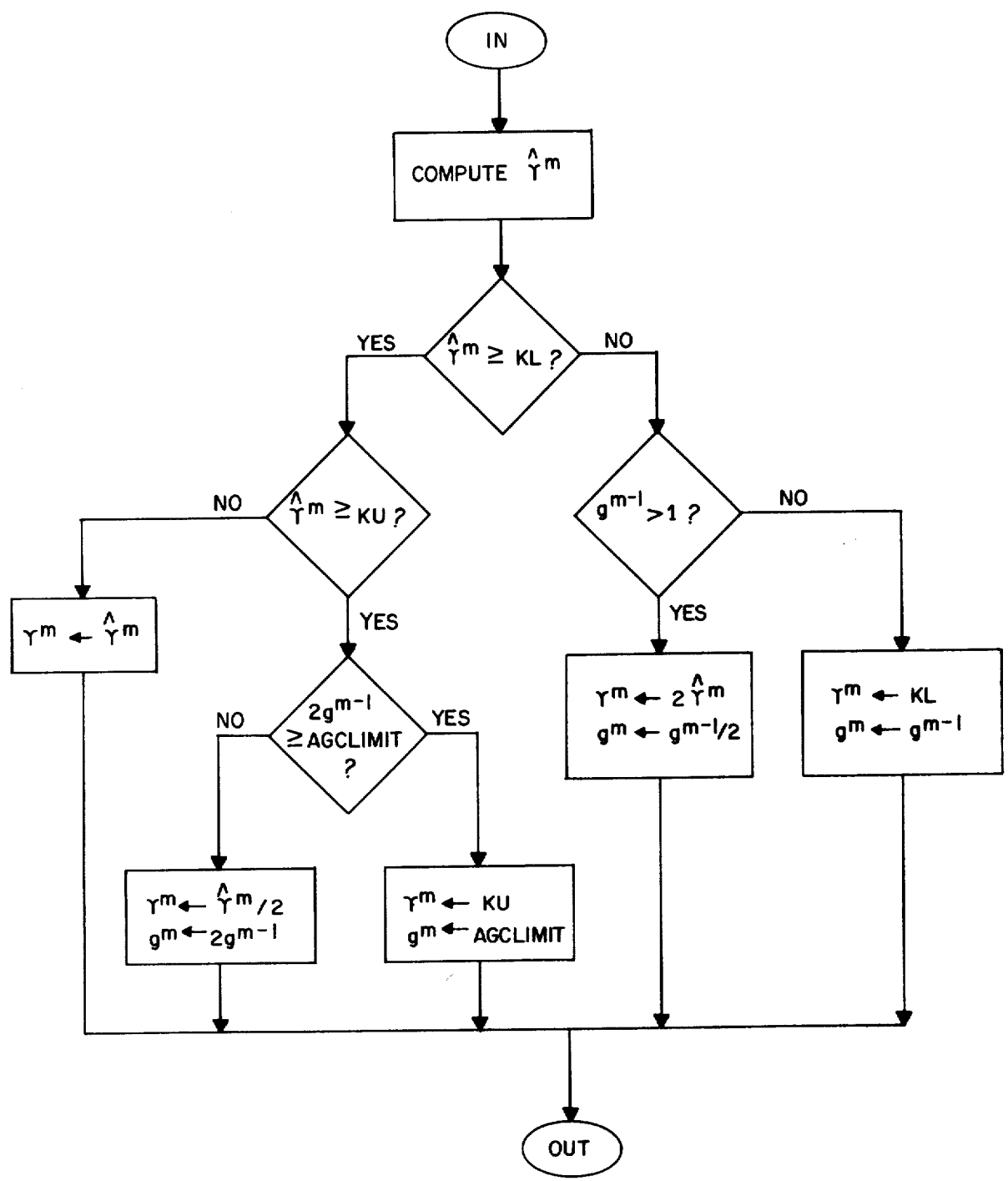
FIG. 7 is a flow chart of a procedure carried out by microprocessor circuitry in the receiver, to determine applied fine and coarse gain control factors.

The procedure which MPU 30 implements, upon receipt of $\hat{\gamma}^m$ from SPE 36, is shown by the flow chart of FIG. 7. The to-be-applied fine gain factor $\gamma^m$ is variable to limits KL and KU, where KU/KL≈2.27. Similarly, coarse gain factor g has a lower limit of 1 and an upper limit of AGCLIMIT, where AGCLIMIT is a function of the selected carrier detect threshold. In effect, MPU 30 compares tentative gain factor $\hat{\gamma}^m$ to find if it is within the limits KL and KU. If so, the desired gain can be achieved by changing $\gamma$ and holding g at its previous value. Therefore, fine gain factor $\gamma^m$ is set equal to $\hat{\gamma}^m$. Otherwise, MPU 30 either sets $g^m$ and $\gamma^m$ at their upper limits, sets $g^m$ and $\gamma^m$ at their lower limits, sets $g^m$ twice its previous value $g^{m-1}$ while setting $\gamma^m$ at half of its tentative value $\hat{\gamma}^m$, or sets $\gamma^m$ at twice its tentative value $\hat{\gamma}^m$, while setting $g^m$ at half of its previous value $g^{m-1}$.

Since $KU=2.27KL$ the gain, g, selected by MPU 30 will be prevented from oscillating back and forth by a value of 2.

Figure 8:
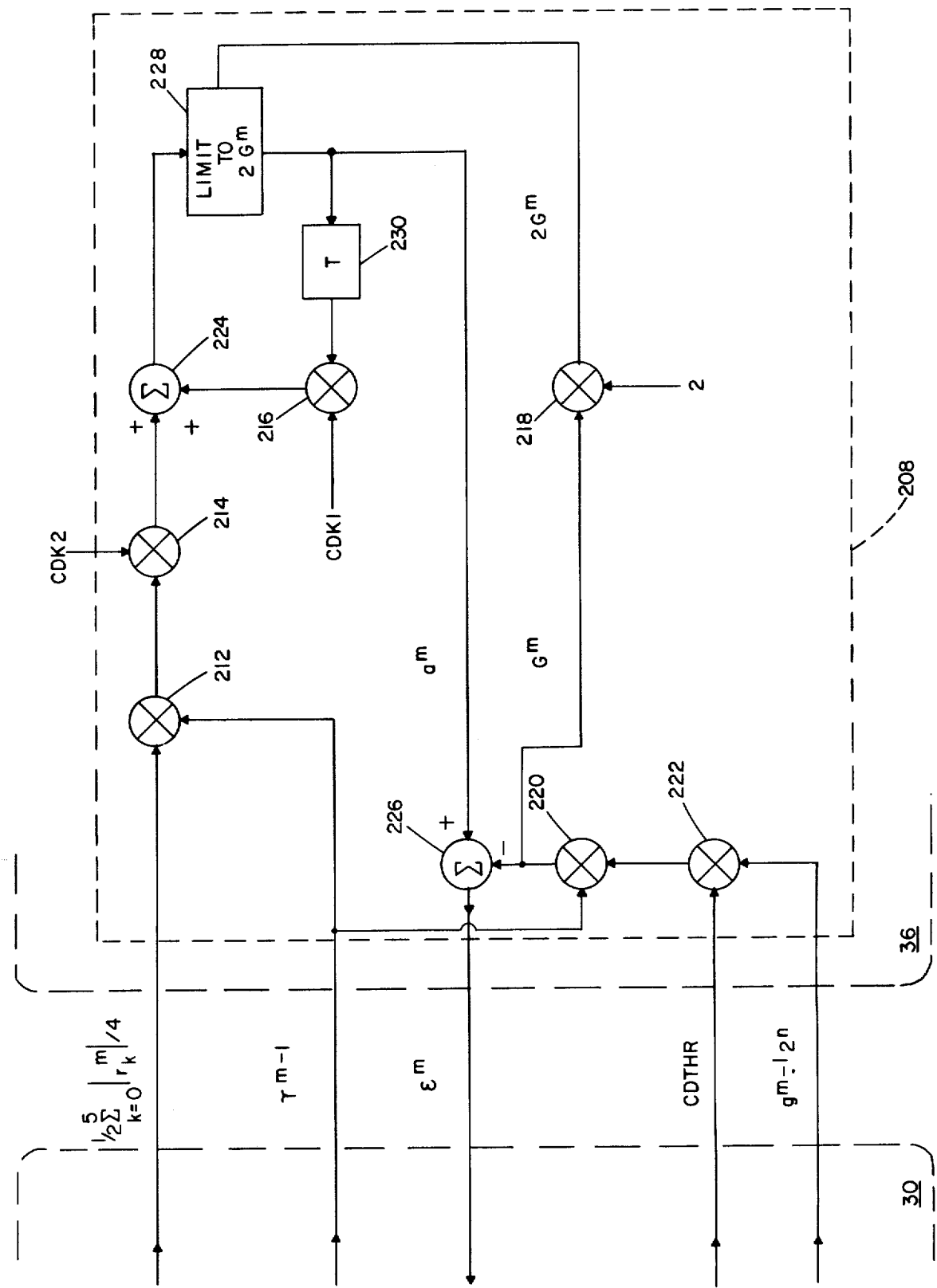
FIG. 8 is a block diagram of a procedure carried out by microprocessor circuitry in the receiver, to determine if carrier has been lost.

Carrier loss circuit 153 of FIG. 3 is implemented by the receiver, according to the digital filtering operation shown in FIG. 8.

Recursive, digital filter 208 consists of: multipliers 213, 214, 216, 218, 220, and 222; adders 224 and 226; limiter 228; and T delay 230. Its inputs, all sent by MPU 30 during the handshake operation are $$\left(\frac{1}{4} \sum_{k=0}^{5} |r_k^m|/4\right), \gamma^{m-1}, (g^{m-1} \cdot 2^n),$$

and CDTHR.

Filter 208 outputs signal $\epsilon^m$ to MPU 30, once each symbol period, during the handshake operation. If $\epsilon^m$ is less than or equal to zero, MPU 30 raises a carrier loss signal.

Carrier loss signal $\epsilon^m$ provided as output by filter 208 is given by:

$$\epsilon^m = a^m - CDTHR\gamma^{m-1}(g^{m-1} \cdot 2^n)$$

where, $$a^m = CDK1\, a^{m-1} + CDK2\, \gamma^{m-1}\left(\frac{1}{4}\sum_{k=0}^{5}|r_k^{m-1}|/4\right).$$

Signal $a^m$, output from limiter 228, is a short term limited average of the signal amplitude, CDK2 and CDK1 determine the gain and time constants, where the time constant factor spans 8 symbols. They are stored in memory 70 as discussed below.

CDTHR is a cnstant fetched from memory 42. The value of n chosen by MPU 30 to compute $(g^{m-1} \cdot 2^n)$ is dependent upon the particular carrier-off threshold which has been selected. For carrier-off thresholds of $-31$, $-38$, $-43$, and $-48$dBm, n equals 1, 0, $-1$, and $-1$ respectively.

If the amplitude of the received signal is high just before dropout, a potential problem is a lengthened time to detect carrier loss.

Choosing a relatively high value for CDK2 and including limiter 228 within filter 208 serves to alleviate this problem. Since $a^m$ then has a maximum value of $2G^m$, where:

$$G^m = CDTHR\, \gamma^{m-1}(g^{m-1} \cdot 2^n),$$

$\epsilon^m$ can have a maximum value of only $G^m$, and the time for $\epsilon^m$ to settle to zero following a dropout, where the received signal level has been relatively high, is reduced.

We now turn to a description of the receiver's start-up procedures: carrier detect, timing jam, and phase jam.

When the receiver is on line, but data transmission is absent, MPU 30 sets g to one of four fixed values, accessible in memory 42. The values for g are chosen such that, on one hand, a received signal having an amplitude of up to 6dB greater than typical will not cause A/D converter 64 to latch up, and, on the other hand, a signal at the chosen carrier-on threshold will not be lost due to poor analog-to-digital resolution.

Figure 9:
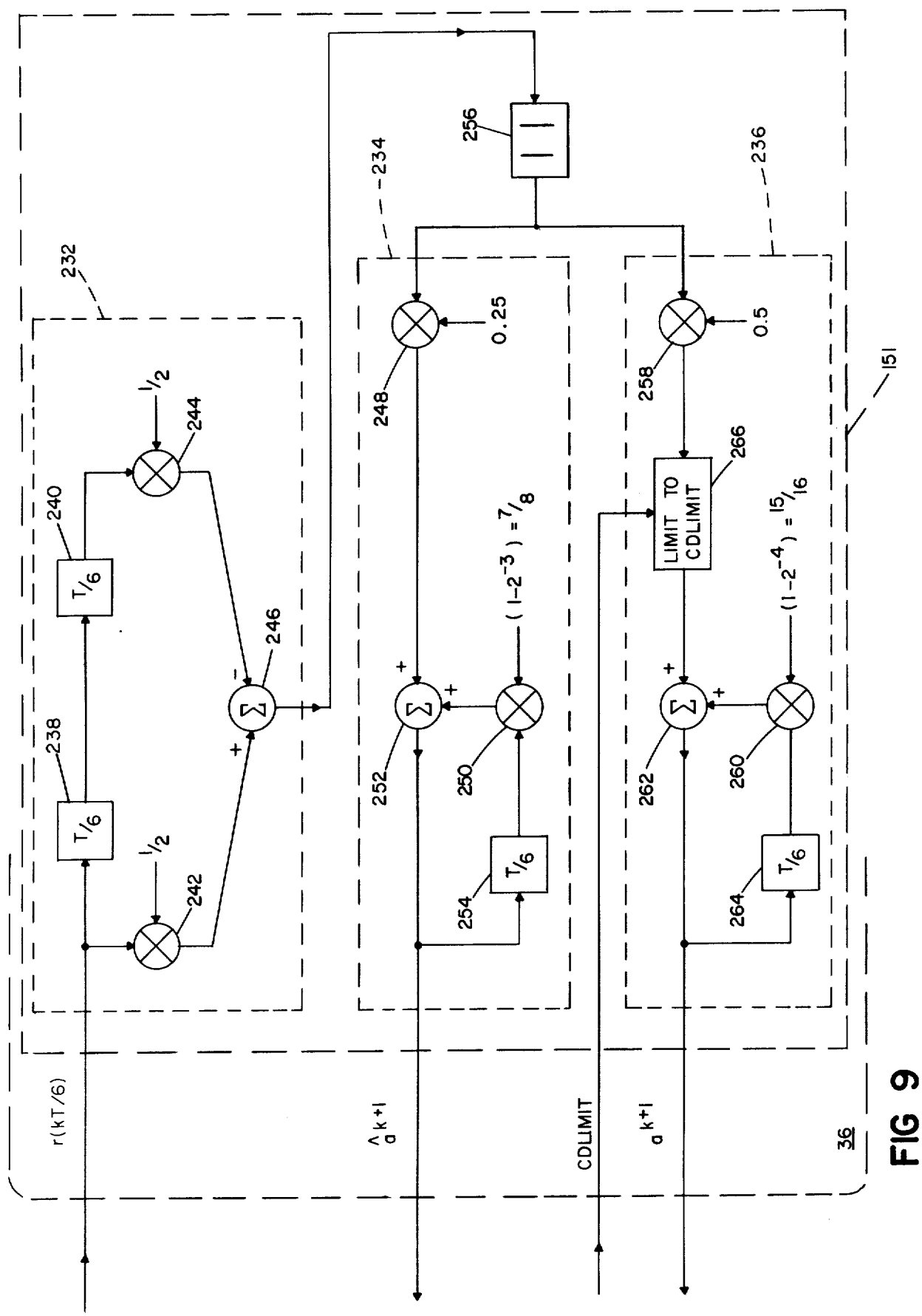
FIG. 9 is a block diagram of a procedure carried out by microprocessor circuitry in the receiver, to determine if carrier is incoming.

The strength of the received signals is continuously monitored by carrier detect circuit 151 of FIG. 3, shown in more detail in FIG. 9. The algorithms shown in FIG. 9 are carried out totally by MPU 30, independent of SPE 36.

Carrier detect circuit 151 is made up of nonrecursive, digital filter 232 and recursive, digital filters 234 and 236.

MPU 30 receives signals r(kT/6), from A/D converter 64, and enters them into filter 232, consisting of T/6 delays 238 and 240, multipliers 242 and 244, and adder 246. Filter 232, having an amplitude shape of $|\sin(\pi f/3600)|$, removes any DC offset and supresses, by 6dB or more, out-of-band signal or noise, below 600 Hz and above 3000 Hz. Its output, $0.5(r(kT/6)-r(kT/6-T/3))$, is fed to absolute value element 256 whose output is input to parallel filters 234 and 236.

Filter 234, made up of multipliers 248 and 250, adder 252, and T/6 delay 254, has output $\hat{a}^{k+1}$, a straight average of the incoming signal amplitude, given by:

$$\hat{a}^{k+1} = \hat{a}^k(1-2^{-3}) + 0.125|r(kT/6) - r(kT/6 - T/3)|,$$

where $2^{-3}$ implies an 8 sample time constant.

Filter 236, made up of multipliers 258 and 260, adder 262, T/6 delay 264, limiter 266, and absolute value element 268, has an output of $a^{k+1}$, given by:

$$a^{k+1} = a^k(1-2^{-4}) + \min(0.25|r(kT/6)-r(kT/6-T/3)|\uparrow, CDLIMIT)$$

where $2^{-4}$ implies a 16 sample time constant and CDLIMIT is one of four different numbers stored in memory 42. The value which MPU 30 uses for CDLIMIT depends upon the particular carrier-on threshold which has been selected. Use of limiter 266 in filter 236 desensitizes carrier detect circuit 151 against impulse noise and also reduces the large difference between maximum and minimum carrier detect time which would exist in its absence.

Each sample period, MPU 30 checks $a^{k+1}$. If it exceeds the carrier-on threshold which has been selected, MPU 30 raises a carrier detect condition and uses $\hat{a}^{k+1}$ as an index for 32-byte gain table, contained in memory 52, to select an initial value for gain factor $g^{m+1}$. MPU 30 also sets gain factor $\gamma$ to an initial value, chosen to be a value halfway between its upper and lower limits, KU and KL. During the remainder of start-up procedures, g and $\gamma$ are frozen at these initial values, their first updating being made upon reaching data mode. At this point, the receiver enters the timing jam mode, a description of which we now turn to.

The method by which the receiver acquires initial timing is generally as follows.

In the C.C.I.T.T. V.26A mode, a 180-degree phase reversal is transmitted, each symbol period, generating two tones at $f_c \pm \frac{1}{2}T$ for a short period of time prior to the transmittal of any data message. In the C.C.I.T.T. V.26B or Bell 201 mode, phase changes of 225 degrees are transmitted, generating tones at $f_c - \frac{3}{8}T$ Hz and $f_c + \frac{5}{8}T$ Hz during this same period. During timing jam, the receiver passes digital samples $\{\hat{r}\}$ of these received "sync-up" signals at a rate of 7,200 samples/sec., through filter 130, whose real and imaginary outputs are squared and added together, 7,200 times per sec. The digitized waveform resulting from this squaring and adding process has a DC component and a sinusoidal component with a frequency of the symbol rate of 1,200 Hz.

The sinusoidal component at 1,200 Hz may be used to derive the synchronous timing required, but it is still necessary to choose the phase of the sampling wave (i.e., that point on the 1,200 Hz sinusoidal waveform which corresponds to a sampling instant). Choice of an improper sampling phase could produce a null in the spectral component at the Nyquist bandedge of the baseband sampled spectrum. Choosing the peaks of the 1,200 Hz, synchronizing waveform maximizes the energy at the edge of the Nyquist baseband spectrum and, thus, minimizes the possiblity of a spectral null at that point.

In the present receiver, six samples are taken, spanning a time period of 1/1200 sec., and passed through filter 130. The resultant real and imaginary outputs are squared and summed for each sample and then compared to determine which is the maximum, and thus corresponds most closely to the peak of the 1,200 Hz sinusoidal waveform. The initial main sample y(mT) to be demodulated is then chosen to be a multiple of six samples (i.e., at a sample rate of 7,200 samples/sec.) later than the maximum sum of squares producing sample. Timing is thus initialized without adjustment to timer 104.

The energy in the symbol-rate sampled baseband spectrum is maximized at $\frac{1}{4}$T Hz and $\frac{3}{4}$T Hz for the "sync-up" transmissions of the C.C.I.T.T. V26A and V.26B (Bell 201) modes, respectively.

More specifically, the receiver implements timing jam as follows.

As soon as the timing jam mode is entered, MPU 30 sends each sample $r_k$ to SPE 36, which, after multiplying $r_k$ by fine gain factor $\gamma$ to produce $\hat{r}_k$, enters the sample $\hat{r}_k$ into the first unit of 21 unit delay line 284, located in memory 74, computes the real and imaginary outputs of filter 130 by beginning computation at the first unit of delay line 284 and proceeding through delay line 284, up to and including the 18th unit, squares the resultant outputs, sums them and enters the sum of their squares on buffer 76.

MPU 30 throws away the contents of buffer 76 for the first 18 T/6 sample periods of timing jam mode, since it takes 18 sample periods before the first 18 units of delay line 284 all contain samples $\{\hat{r}\}$ (i.e., for the transient to pass). Beginning with the 18th sample period of timing jam mode, MPU 30 buffers each incoming sample $\hat{r}_k$ in six-sample buffer unit 270, as well as sending it to SPE 36, where it is entered into a first delay unit 286 of filter 130. Filter 130 is then "cycled" through the first 18 delay units, and the sum of the squares of its outputs are sent to MPU 30 via buffer 76. MPU 30 now reads the contents of buffer 76 and stores it in memory 44.

The next five $\{\hat{r}\}$ samples are processed in the same manner by MPU 30 and SPE 36, the second sample arriving after the transient has passed being entered in the second unit of six-sample buffer 270, and so on.

When six-sample buffer 270 is full, MPU 30 runs a routine to determine which of the samples $\{\hat{r}\}$ produced the maximum summed, squared filter 130 outputs. The samples $\{\hat{r}\}$ contained in six-sample buffer 270 are then shifted, such that any samples received after the maximum producing sample $\{\hat{r}\}$ occupy the earliest time slots of buffer 270. Enough additional samples $\{\hat{r}\}$ are then collected to fill buffer 270, and timing jam terminates.

Figure 10:
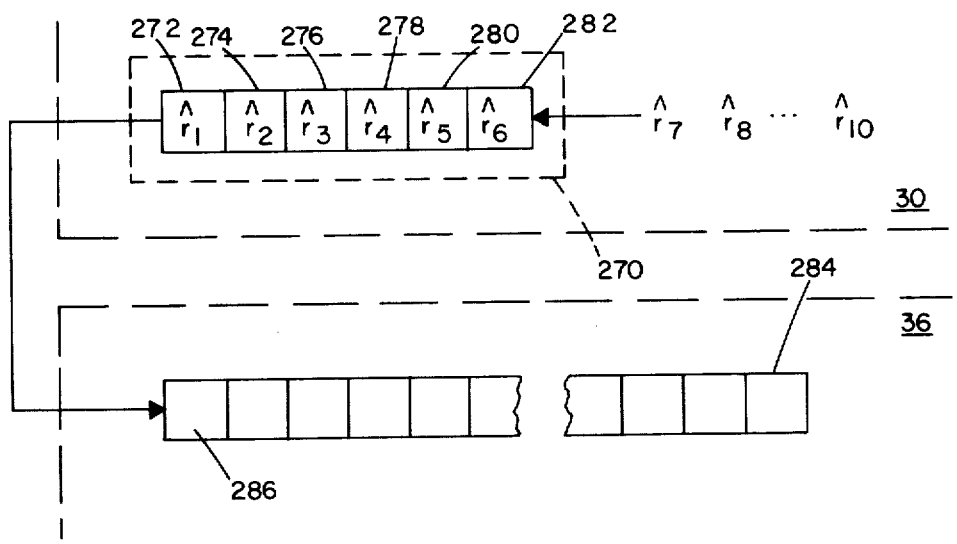
FIGS. 10 and 11 are block diagrams illustrating the method by which microprocessor circuitry in the receiver initializes timing.
Figure 11:
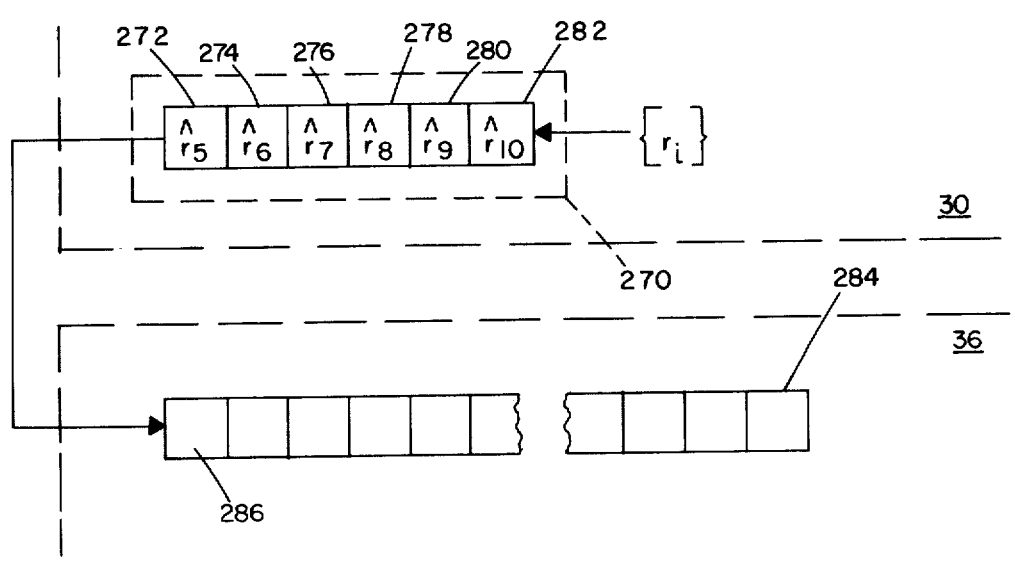

By way of example, FIGS. 10 and 11 show the shifting process that MPU 30 would implement had the sample $\hat{r}_4$ (i.e., the sample occupying fourth buffer unit 278) produced the maximum summed and squared filter 130 output. FIG. 10 shows the contents of buffer 270 prior to the shifting operation, while FIG. 11 shows the contents of buffer 270 just after completion of timing jam.

In FIG. 11, samples $\hat{r}_5$ and $\hat{r}_6$ have been shifted to the two buffer units 272 and 274 representing the two earliest time slots of the six-sample baud. Additional samples $\hat{r}_7, \hat{r}_8, \hat{r}_9,$ and $\hat{r}_{10}$ have been entered into buffer units 276, 278, 280, and 282, respectively.

Sample $r_{10}$, being 6 sample periods more recent than $r_4$, is another maximum square producing sample. After the sequential transfer of samples $\hat{r}_4$ to $\hat{r}_{10}$ to 21 unit delay line 284, located within SPE 36, $\hat{r}_{10}$ will occupy first delay unit 286. As SPE 36 receives each of the samples $\hat{r}_5$ to $\hat{r}_{10}$, it writes each sample into the appropriate unit of delay line 286. Thus, $\hat{r}_5$ and $\hat{r}_6$ are "rewritten" into delay line 284 while $\hat{r}_7$ to $\hat{r}_{10}$ are entered as new samples.

It has been discovered that additional timing jam accuracy is achieved by digitally filtering the output of filter 130 before squaring and summing to determine the maximum sum of squares. In the present modem a complex digital filter $(1-D^4)$ (not shown), having a frequency response of $2j \exp(-j\pi f/1800) \sin(\pi f/1800)$, processes the output of filter 130 during timing jam only. The output of this timing jam filter is then squared and summed, as above described, for each sample r taken during timing jam.

The timing jam filter has a flat group delay characteristic of two sample intervals which is taken into account, once the main sample has been selected, by correct placement of the samples in delay line 284 to maintain the time ordered sequence.

The amplitude response of the timing jam filter has nulls at 0, 1800, and 3600 Hz and peaks at 900 and 2700 Hz. The 2700 Hz spectral component sent during the 1200 b/s V.26A sync-up is boosted 6dB with respect to the 1500 Hz spectral component. Similarly, the 2550 Hz component sent during the V.26B (Bell 201) sync-up is boosted with respect to the stronger 1350 Hz spectral component.

Timing jam completed, the receiver enters the phase jam mode, wherein the main coefficient of equalizer 138 is set to an initial value, such that the first nonzero output of equalizer 138 lies on one of the 45° axes of the complex plane. This is implemented as follows.

Referring to FIG. 11, the six samples $\hat{r}$ contained in buffer 270 are sequentially transferred to delay line 284. Filter 130 is then cycled for time mT, with computations beginning at first delay unit 286 and proceeding up to, and including, the 18th delay unit. The resulting output of filter 130 is used, via methods well known in the art, to initialize the equalizer coefficients of circuitry 138.

The modem now enters the data mode described above, after the equalizer coefficients have been equalized.

Table I is a flow chart showing the time sequence of operations carried out by MPU 30 and SPE 36 during data mode. The sequence of operations shown begins at time mT.

TABLE I

| | | Comments |
|---|---|---|
| 1. | BEGIN MPU 30-SPE 36 EXCHANGE | |
| 2. | MPU 30 loads $g^{m-1}$ in AGC 62 | |
| 3. | $\left(i \sum_{k=0}^{5} |r_k{}^m|/4\right)$ | Previously computed by MPU 30 |
| 4. | $\gamma^{m-1}$ | Previously computed by MPU 30 |
| 5. | $r_k{}^m$, k=0, . . . 5, sent to SPE 36 | Buffered in memory 44. As each sample is transferred, SPE 36 multiplies it by $\gamma^{m-1}$. |
| 6. | $\hat{\tau}_c{}^{m-1}$ to MPU 30 | MPU 30 updates timing recovery circuit |
| 7. | Compute $a^m$ in SPE 36 | Limited average for carrier loss detection |
| 8. | From MPU 30: $g^{m-1}$ | |
| 9. | Compute $\epsilon^m$ in SPE 36 | Carrier loss indicator |
| 10. | Compute $\alpha^m$ in SPE 36 | Long term average for AGC 62 update |
| 11. | $\epsilon^m$ to MPU 30 | |
| 12. | Compute $\hat{\gamma}^m$ in SPE 36 | Updated tentative fine gain factor |
| 13. | $\hat{\gamma}^m$ to MPU 30 | |
| 14. | $z_I^{m-1}$ to MPU 30 | Previous imaginary output |
| 15. | $z_r^{m-1}$ to MPU 30 | Previous real output |
| 16. | END MPU 30-SPE 36 EXCHANGE | MPU 30 decodes data and performs checks on $\hat{\gamma}^m$ and $g^{m-1}$ to obtain $\gamma^m$ and $g^m$ |
| | IN SPE 36: | |
| 17. | Compute $y_r(mT-T/2)$, $y_i(mT-T/2)$ | T/2 outputs of real and imaginary filters 132 and 134 |
| 18. | Compute $y_r(mT)$, $y_i(mT)$ | T outputs of real and imaginary filters 132 and 134 |
| 19. | Update equalizer coefficients | |
| 20. | Compute $z_r{}^m$, $z_I{}^m$ | Real and imaginary components of output of demodulator and equalizer 138 |
| 21. | Compute $d_r{}^m$, $d_I{}^m$ | Real and imaginary components of output of decision circuit 142 |
| 22. | Compute $\tau_e{}^m$ | Timing error |
| 23. | Compute $\hat{\tau}_e{}^m$ | Filtered timing error |
| 24. | Compute $\tau_c{}^m$ | Accumulated filtered timing error |
| 25. | Compute $\hat{\tau}_c{}^m$ | Timing correction |
| 26. | If $\tau_c{}^m$ nonzero then reset $\hat{\tau}_c{}^m$ to zero | |

During the prior symbol period, MPU 30 has, based on the tentative value $\hat{\gamma}^{m-1}$ received from SPE 36 during the prior handshake, computed $g^{m-1}$ and $\gamma^{m-1}$ (the gain factors which will actually be applied), in accordance with the flow chart of FIG. 8, as explained above. MPU 30 has also buffered, on buffer 270 of FIGS. 11 and 12, the 6 samples $r_k{}^m$ for k=0, 1, 2, 3, 4, 5, received from A/D converter 64 during the time period (m−1) T to mT. Additionally, as each sample $r_k{}^m$ was received MPU 30 performed the calculation ($|r_k{}^m|/4$) and accumulated the results for each sample sent. Therefore, MPU 30 also has in storage $$\left(i \sum_{k=0}^{5} |r_k{}^m|/4\right)$$

As the handshake begins, MPU 30 first loads the computed $g^{m-1}$ into latch 124 of AGC 62. Next, MPU 30 sends to SPE 36 the computed values $$\left(i \sum_{k=0}^{5} |r_k{}^m|/4\right)$$

and $\gamma^{m-1}$, and buffered samples $\hat{r}_k{}^m$. As each sample $r_k{}^m$ is received by SPE 36 it is multiplied by $\gamma^{m-1}$ to obtain $r_k{}^m$ which is placed on 21 unit delay line 284 of filter 130.

During the prior symbol period (m−1)T to mT, SPE 36 has computed $\hat{\tau}_c{}^{m-1}$, the timing error accumulated up to time mT. SPE 36 sends $\hat{\tau}_c{}^{m-1}$ to MPU 30 which, as explained above, adjusts programmable timer 104 if $\hat{\tau}_c{}^{m-1}$ is nonzero.

Based on the value $$\left(i \sum_{k=0}^{5} |r_k{}^m|/4\right)$$

previously received from MPU 30, SPE 36 now computes $a^m$, the short term limited average of $r_k{}^m$, for i=0, ... 5. MPU 30 then sends the previously used gain factor $g^{m-1}$.

Next SPE 36 performs two computations: using $a^m$, $\gamma^{m-1}$, and $g^{m-1}$ it computes $\epsilon^m$ (the carrier loss indicator) according to the filtering operation of FIG. 9 and, using $$\left( 1 \sum_{k=0}^{5} |r_k^m|/4 \right) \gamma^{m-1}$$

and $\alpha^{m-1}$, it updates $\alpha^m$, the long term average signal magnitude according to the filtering operation of FIG. 6.

SPE 36 now sends $\epsilon^m$ to MPU 30. Upon receiving $\epsilon^m$, MPU 30 checks to see whether $\epsilon^m > 0$. If not, carrier loss is declared. Meanwhile, SPE 36 computes tentative fine gain factor $\hat{\gamma}^m$. This is sent to MPU 30 along with $z_i^{m-1}$ and $z_r^{m-1}$, the previously computed imaginary and real components of demodulator and equalizer 138 output. This ends the handshake.

SPE 36 now performs a number of computations, independently of MPU 30. In order, the following values are computed: the output of filter 130 at times mT and $mT - T/2$; the updated equalizer coefficients for the equalizer, the demodulated and equalized output at time mT, $z^m$; the output of decision function 142, $d^m$; and the filtered and timing correction, $\hat{\tau}_c^m$.

At the same time, MPU 30 uses $z^{m-1}$ to compute $d^{m-1}$, decodes (and descrambles, if not in the 201-compatible mode) $d^{m-1}$, provides decoded $d^{m-1}$ as dibits at register 56, buffers samples incoming from A/D converter 64, and computes $\gamma^m$ and $g^m$, whence the cycle is repeated.

Programmable timer 108, which serves a "watchdog" function, has a set lapse time and is reset to a predetermined time interval by MPU 30 once every cycle during data mode. Should MPU 30 get caught in a loop due to a malfunction and overrun the lapse time, programmable timer 108 will interrupt the cycle and cause MPU 30 to raise an alarm signal.

The microinstruction format of SPE 36 is shown in Table II.

TABLE II

MICROINSTRUCTION FORMAT

| 17 | 16 15 14 | 13 12 | 11 10 |
|---|---|---|---|
| MPC CONTROL | RAM AR MODIFICATION | DESTINATION | SOURCE |

| 11 | 10 | SOURCE |
|---|---|---|
| 0 | 0 | Enable AH |
| 0 | 1 | Enable AH, then clear A |
| 1 | 0 | Enable RAM (data memory) |
| 1 | 1 | Enable constant |

| 13 | 12 | DESTINATION |
|---|---|---|
| 0 | 0 | RAM (data memory) at address (in RAM AR) |
| 0 | 1 | X, start multiply |
| 1 | 0 | Y |
| 1 | 1 | AH |

| 16 | 15 | 14 | RAM AR MODIFICATION |
|---|---|---|---|
| 0 | 0 | 0 | Decrement RAM AR by 16 and by 1"mod"16 |
| 0 | 0 | 1 | Increment RAM AR by 16 and by 1"mod"16 |
| 0 | 1 | 0 | Decrement RAM AR by 1"mod"16 |
| 0 | 1 | 1 | Increment RAM AR by 1"mod"16 |
| 1 | 0 | 0 | Decrement RAM AR by 16 |
| 1 | 0 | 1 | Increment RAM AR by 16 |
| 1 | 1 | 0 | No change to RAM AR |
| 1 | 1 | 1 | No change to RAM AR |

TABLE II-continued

MICROINSTRUCTION FORMAT

| 17 | 16 15 14 | 13 12 | 11 10 |
|---|---|---|---|
| MPC CONTROL | RAM AR MODIFICATION | DESTINATION | SOURCE |

| 17 | | |
|---|---|---|
| 0 | repeat until | 14=0, MPU-SPE BUFFER addressed. |
| | | 14=1, SKIP signal from MPU. |
| 1 | continue | |

When 17 = 1 (normal SPE program execution) and 11, 10 = (binary) 11, i.e., data source is constant:

```
     14 = 0                    14 = 1
→ INSTRUCTION           → INSTRUCTION
  CONSTANT                CONSTANT          CONS1
  NEXT INSTR              ALTERNATE CONS    CONS2
                          NEXT INSTR
```

SELECT CONS2 = 0, data source is CONS1.
SELECT CONS2 = 1, data source is CONS2.

The 8 bits in the instruction word are labeled 17, 16 . . ., 10, where 17 is the most-significant bit (MSB) and 10 is the least-significant bit (LSB).

11, 10 specify one of four possible sources of data while 13, 12 specify one of four possible destinations. All instructions, therefore, involve data transfers from one of the SPE devices to another via the 8-bit SPE data bus.

Simultaneously with a data transfer the data memory address register (RAM AR) may be modified as shown in Table II. 16, 15 determine the manner in which the contents of RAM AR are to be modified while 14 determines the direction of modification, that is, increment or decrement. The advantages of the proposed method of operand address modification for signal processing applications are discussed later.

The MSB, 17, of the instruction word determines whether the microprogram counter (MPC) is to advance to the next instruction address (normal mode) or stop (repeat the current instruction with RAM AR modification disabled). There are three ways in which the SPE may be released from its halt (or repeat) state: (a) the MPU may load the MPC with a new starting address; (b) the MPU may address read/write buffer 76 for a read or write operation (data transfer between MPU and SPE); (c) the MPU may raise a control signal SKIP available to the MPU, independent of the state of the SPE. One of the latter two options, (b) or (c), is effective when 17=0 and 14=0 or 14=1, respectively.

One other feature of the SPE instructions is the use of data words(s) immediately following the instruction in the SPE program memory as constants. Certain instructions, therefore, permit a constant to be transferred to certain SPE devices. These instructions are either two words or three words depending on instruction bit 14 as shown in Table I. When 14=0, a single constant is contained in the program memory word following the instruction. When 14=1, two constants are stored immediately following the instruction word, only one of which is transferred to the destination specified in the instruction. The selection between the two alternate constants is made by a signal SELECT CONS2.

Instructions containing constants are executed as follows:

1. Single Constant Instruction:

a. The instruction word is fetched from program memory and stored in instruction register (IR).

b. The MPC is incremented to point to the constant in the next location.

c. The constant is enabled on the SPE data bus via buffer 92.

d. The MPC is incremented to fetch next instruction.

2. Double Constant Instruction:

a. The instruction work is fetched from program memory and stored in IR.

b. The MPC is incremented by 1 or 2 depending on SELECT CONS2 (0 or 1) to point to the selected constant.

c. The constant is enabled on the SPE data bus via buffer 92.

d. The MPC is incremented by 2 or 1 depending on SELECT CONS2 (0 or 1) to point to the next instruction.

A constant may not be transferred to X. Instead this particular combination of instruction bits, 13−10=0111, is decoded specially as a "compare A" instruction. This intruction allows the sign-bit of the accumulator contents (MSB of AH) to affect the execution of the next SPE instruction. thus, when a MOVKY (move constant to Y) instruction follows a CMPRA (compare A) the constant is, not only loaded in Y, but also loaded into MPC via the MPU data bus, provided the accumulator contents were greater than or equal to zero (i.e., sign bit of AH=0). In this way the SPE is provided with a limited decision-making capability through conditional jump instructions (conditioned on the sign of the accumulator contents).

The multiply instruction is a special form of "data transfer" where loading the multiplicand in X initiates a multiplication and addition according to $$A = A + XY,$$

where Y has been previously loaded with the multiplier. Multiplications are 8-bit by 8-bit and the products are accumulated to 16-bit accuracy in the high and low parts of the accumulator, AH and AL.

All instructions take 1 period of the cycle clock (1.8432MHz) except the multiply instruction which is extended to 4 cycles and the result of the multiply and add is not available until after the 5th cycle. However, another instruction such as MOVMY (move next multiplier from data memory to Y) may be executed during the 5th cycle while the multiplication is still in progress. Using this pipelining technique, sums of products may be accumulated at a maximum rate of $1.8432 \times 10^6/5$ or 368,640 times per second.

The multiplication is performed serially by shifting the multiplier from Y into X one bit per high-speed clock (7.3728 MHz) period for 16 clock periods. The product XY is produced one bit at a time and added serially to the previous contents of the accumulator. The updated accumulator contents are, therefore, available at the end of the 5th clock cycle.

When the instruction bits 11, 10 are 01 the high part of the accumulator AH is the source of the data to be transferred. In addition, when the data transfer to the desired destination (according to instruction bits 13, 12) is complete, the accumulator is "cleared" in preparation for the next instruction.

Whenever the accumulator is "cleared" or AH is loaded, the low part of the accumulator is set to the 8-bit value "1000 0000." Thus, results of all computations are automatically rounded to the most significant 8 bits. This rounded result is available in AH.

As reference to Table II indicates, SPE 36's instruction set includes provision, in bits 14, 15, and 16 for altering the address stored in RAM AR 72. In particular the address currently stored in RAM AR 72 may be either incremented or decremented by 16, 1 "mod" 16, or 16 and 1 "mode" 16. As used here the increment/decrement by n "mod" m modification denotes the following. Let the previous address register contents be denoted by the sum b+r, where $b = \lfloor (b+r)/m \rfloor$ is the greatest integer part of the fraction (b+r)/m. "b" may be interpreted as the base address of a circular buffer of length m, and r as the index to a particular location in that buffer. Then the modification (increment/decrement by n "mod" m) changes the address register contents to $b + r \pm n - \lfloor (r+N)/m \rfloor$. In practice, it is convenient to choose b such that $b = \lfloor (b+r)/2^k \rfloor$, where $2^{k-1} < m \leq 2^k$. Further, the circuit implementation may be simplified if m and n are restricted to be equal to 1 and $2^k$ (e.g., 16), respectively.

Modification of the address contained in RAM AR 72 may be carried out simultaneously with the data transfers and arithmetic operations specified by bits 10, 11, 12, and 13. Machine instructions for SPE 36 containing the proper values in bits 14, 15, and 16 can simulate the effect of a "circular buffer" having a length of 16 memory locations. The RAM AR pointer can thus be stepped through 16 successive memory locations in a circular fashion. Buffers of length greater than 16 memory locations can be simulated by using multiple successive groups of 16 successive addresses, limited only by the memory available and/or the capacity of the address bus.

Since a circular buffer of variable length can be simulated, a key operation of digital signal processing, the repeated computation of the inner product of one vector (e.g., the coefficients of filter 130) with shifted versions of another vector (e.g., the sample contents of delay line 186) is simplified.

For example, the main sample output of filter 130 is computed easily by simulating a 21 unit circular buffer, writing a newly received sample in the unit containing the most ancient sample, and stepping the "modulo" pointer through 18 address locations.

Other embodiments are within the following claims. For example, transmitter chip 114 could include digital, programmable microprocessor circuitry which, when supported by attendant memory and bus circuitry, could function in a similar relationship with MPU 30 as does the modem receiver described above. MPU 30 could then function as a link between the terminal and the modem, communicating with the transmitter and/or the receiver through similar time limited handshakes as are above described.

In the preferred embodiment described above, features relating to freezing the equalizer in the presence of a periodic signal, and to the combination of a digital band pass phase-splitting filter (particularly with its ability to provide asymmetrical amplitude and phase response) and subsequent demodulation, were respectively the inventions of G. David Forney and Andrew Kameya.

I claim:

1. Modem apparatus in which a modulated carrier signal represents digital bits, wherein said apparatus comprises first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, first bus circuitry connected to said first programmable digital circuitry for carrying said digital values and said arithmetic program instructions, and first memory circuitry connected to said first bus circuitry for storing said instructions, digital values, and signal values, second digital processing circuitry comprising second programmable digital circuitry for generating control signals corresponding to predetermined sequences of said arithmetic instructions, second bus circuitry connected to said second programmable circuitry for carrying said control signals, and second memory circuitry connected to said second bus circuitry for storing control signal program instructions, timing circuitry for timing the operation of said first and second processing circuitries, and means for providing a sequence of time-limited handshakes between said first and second processing circuitries, during which said control signals are transferred to said first processing circuitry to cause said first programmable digital circuitry to carry out said predetermined sequences of said arithmetic instructions, said second digital processing circuitry including means responsive to the level of said modulated carrier signal, as received, for selecting a particular one of said control signals for transfer to said first digital processing circuitry during a subsequent said handshake.

2. The apparatus of claim 1 wherein said particular one of said control signals is a carrier detect signal and said first processing circuitry includes means for causing said modem to enter a set-up mode upon receipt of said carrier detect signal.

3. The apparatus of claim 1 wherein said first digital processing circuitry has means to generate a carrier loss signal for transmission to said level-responsive means of said second digital processing circuitry for selection of said particular one of said control signals.

4. Modem apparatus in which a modulated carrier signal represents digital bits, wherein said apparatus comprises first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, first bus circuitry connected to said programmable digital circuitry for carrying said digital values and said arithmetic program instructions, first memory circuitry connected to said bus circuitry for storing said instructions, digital values, and signal values, and means for repeatedly manipulating in a predetermined order a sequence of successively produced said digital values, wherein, for each of said repeated manipulations, a subsequent digital value is added to said sequence and a digital value is eliminated from said sequence by the first-in first-out method, said means comprising storage means for storing said sequence of said digital values in a sequence of memory positions, means for repeatedly replacing the then first-in digital value in its memory position with a said subsequent digital value, without moving other said digital values between memory positions, and means for repeatedly addressing said memory positions in said predetermined order by changing the initially addressed said position for each of said repeated manipulations, second digital processing circuitry comprising second programmable digital circuitry for generating control signals corresponding to predetermined sequences of said arithmetic instructions, second bus circuitry connected to said second programmable circuitry for carrying said control signals, and second memory circuitry connected to said second bus circuitry for storing control signal program instructions, timing circuitry for timing the operation of said first and second processing circuitries, and means for providing a sequence of time-limited handshakes between said first and second processing circuitries, during which said control signals are transferred to said first processing circuitry to cause said first programmable digital circuitry to carry out said predetermined sequences of said arithmetic instructions.

5. Modem apparatus in which a modulated carrier signal represents digital bits, wherein said apparatus comprises, first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, first bus circuitry connected to said programmable digital circuitry for carrying said digital values and said arithmetic program instructions, first memory circuitry connected to said bus circuitry for storing said instructions, digital values, and signal values, and means for repeatedly manipulating in a predetermined order a sequence of successively produced said digital values, wherein, for each of said repeated manipulations, a subsequent digital value is added to said sequence and a digital value is eliminated from said sequence by the first-in first-out method, said means comprising storage means for storing said sequence of said digital values in a sequence of memory positions, means for repeatedly replacing the then first-in digital value in its memory position with a said new digital value, without moving other said digital values between memory positions, and means for repeatedly addressing said memory positions in said predetermined order by changing the initially addressed said position for each of said repeated manipulations, second digital processing circuitry comprising second programmable digital circuitry for producing a correspondence between said signal values and bit values representing said signal values, second bus circuitry connected to said second programmable circuitry for carrying said signal values, and second memory circuitry connected to said second bus circuitry for storing a table of correspondence between said signal values and said bit values, timing circuitry for timing the operation of said first and second processing circuitries, and means for providing a sequence of time-limited handshakes between said first and second processing circuitries, during which said signal values are transferred between said first and second processing circuitries.

6. Modem apparatus in which a modulated carrier signal represents digital bits, wherein said apparatus comprises first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, said first programmable circuitry comprising circuitry for generating said sequence of signal values based upon said modulated carrier signal, as received, to produce said correspondence, first bus circuitry connected to said programmable digital circuitry for carrying said digital values and said arithmetic program instructions, and first memory circuitry connected to said bus circuitry for storing said instructions, digital values, and signal values, second digital processing circuitry comprising second programmable digital circuitry for generating control signals corresponding to predetermined sequences of said arithmetic instructions, second bus circuitry connected to said second programmable circuitry for carrying said control signals, second memory circuitry connected to said second bus circuitry for storing control signal program instructions, and carrier detect means for determining the average level of said received modulated carrier signal and raising a carrier detect signal whenever said average level exceeds a predetermined threshold, timing circuitry for timing the operation of said first and second processing circuitries, and means for providing a sequence of time-limited handshakes between said first and second processing circuitries, during which said control signals are transferred to said first processing circuitry to cause said first programmable digital circuitry to carry out said predetermined sequences of said arithmetic instructions.

7. Modem apparatus in which a modulated carrier signal represents digital bits, wherein said apparatus comprises, first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing the duration of a modulation period of said carrier signal, said first programmable circuitry comprising circuitry for generating said sequence of signal values based upon said modulated carrier signal, as received, to produce said correspondence, first bus circuitry connected to said programmable digital circuitry for carrying said digital values and said arithmetic program instructions, and first memory circuitry connected to said bus circuitry for storing said instructions, digital values, and signal values, second digital processing circuitry comprising second programmable digital circuitry for producing a correspondence between said signal values and bit values representing those signal values, second bus circuitry connected to said second programmable circuitry for carrying said signal values, second memory circuitry connected to said second bus circuitry for storing a table of correspondence between said signal values and said bit values, and carrier detect means for determining the average level of said received modulated carrier signal and raising a carrier detect signal whenever said average level exceeds a predetermined threshold, timing circuitry for timing the operation of said first and second processing circuitries, and means for providing a sequence of time-limited handshakes between said first and second processing circuitries, during which said signal values are transferred between said first and second processing circuitries.

8. Modem apparatus in which a modulated carrier signal represents digital bits, wherein said apparatus comprises first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, said first programmable circuitry comprising circuitry for generating said sequence of signal values based upon said modulated carrier signal, as received, to produce said correspondence, first bus circuitry connected to said programmable digital circuitry for carrying said digital values and said arithmetic program instructions, first memory circuitry connected to said bus circuitry for storing said instructions, digital values, and signal values, and carrier loss means for determining the average level of said received modulated carrier signal and raising a carrier loss signal whenever said average level falls below a predetermined threshold, second digital processing circuitry comprising
second programmable digital circuitry for generating control signals corresponding to predetermined sequences of said arithmetic instructions,
second bus circuitry connected to said second programmable circuitry for carrying said control signals, and
second memory circuitry connected to said second bus circuitry for storing control signal program instructions, and timing circuitry for timing the operation of said first and second processing circuitries, and means for providing a sequence of time-limited handshakes between said first and second processing circuitries, during which said control signals are transferred to said first processing circuitry to cause said first programmable digital circuitry to carry out said predetermined sequences of said arithmetic instructions.

9. Modem apparatus in which a modulated carrier signal represents digital bits, wherein said apparatus comprises, first digital processing circuitry comprising
first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, said first programmable circuitry comprising circuitry for generating said sequence of signal values based upon said modulated carrier signal, as received, to produce said correspondence,
first bus circuitry connected to said programmable digital circuitry for carrying said digital values and said arithmetic program instructions,
first memory circuitry connected to said bus circuitry for storing said instructions, digital values, and signal values, and
carrier loss means for determining the average level of said received modulated carrier signal and raising a carrier loss signal whenever said average level falls below a predetermined threshold, second digital processing circuitry comprising
second programmable digital circuitry for producing a correspondence between said signal values and bit values representing those signal values,
second bus circuitry connected to said second programmable circuitry for carrying said signal values, and
second memory circuitry connected to said second bus circuitry for storing a table of correspondence between said signal values and said bit values, timing circuitry for timing the operation of said first and second processing circuitries, and means for providing a sequence of time-limited handshakes between said first and second processing circuitries, during which said signal values are transferred between said first and second processing circuitries.

10. Modem apparatus in which a modulated carrier signal represents digital bits, wherein said apparatus comprises first digital processing circuitry comprising
first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, said first programmable circuitry comprising circuitry for generating said sequence of signal values based upon said modulated carrier signal, as received, to produce said correspondence,
first bus circuitry connected to said programmable digital circuitry for carrying said digital values and said arithmetic program instructions,
first memory circuitry connected to said bus circuitry for storing said instructions, digital values, and signal values, and
means for computing a value representative of a carrier gain adjustment which, when applied to said received modulated carrier signal, would produce an adjusted modulated carrier signal having an average level equal to a predetermined value, second digital processing circuitry comprising
second programmable digital circuitry for generating control signals corresponding to predetermined sequences of said arithmetic instructions,
second bus circuitry connected to said second programmable circuitry for carrying said control signals, and
second memory circuitry connected to said second bus circuitry for storing control signal program instructions, timing circuitry for timing the operation of said first and second processing circuitries, and means for providing a sequence of time-limited handshakes between said first and second processing circuitries, during which said control signals are transferred to said first processing circuitry to cause said first programmable digital circuitry to carry out said predetermined sequences of said arithmetic instructions.

11. Modem apparatus in which a modulated carrier signal represents digital bits, wherein said apparatus comprises, first digital processing circuitry comprising
first programmable digital circuitry for arithmetic manipulation of digital values in accordance with selectable arithmetic program instructions to produce a correspondence between a sequence of signal value at a rate of 1/T signal values per second and a sequence of samples at a rate higher than 1/T samples per second representing said modulated carrier signal, where T represents the duration of a modulation period of said carrier signal, said first programmable circuitry comprising circuitry for generating said sequence of signal values based upon said modulated carrier signal, as received, to produce said correspondence,
first bus circuitry connected to said programmable digital circuitry for carrying said digital values and said arithmetic program instructions, first memory circuitry connected to said bus circuitry for storing said instructions, digital values, and signal values, and means for computing a value representative of a carrier gain adjustment which, when applied to said received modulated carrier signal, would produce an adjusted modulated carrier signal having an average level equal to a predetermined value, second digital processing circuitry comprising second programmable digital circuitry for producing a correspondence between said signal values and bit values representing those signal values, second bus circuitry connected to said second programmable circuitry for carrying said signal values, and second memory circuitry connected to said second bus circuitry for storing a table of correspondence between said signal values and said bit values, timing circuitry for timing the operation of said first and second processing circuitries, and means for providing a sequence of time-limited handshakes between said first and second processing circuitries, during which said signal values are transferred between said first and second processing circuitries.

12. Modem apparatus in which a modulated carrier signal represents digital bits, wherein said apparatus comprises first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, said first programmable circuitry comprising circuitry for generating said sequence of signal values based upon said moulated carrier signal, as received, to produce said correspondence, first bus circuitry connected to said programmable digital circuitry for carrying said digital values and said arithmetic program instructions, and first memory circuitry connected to said bus circuitry for storing said instructions, digital values, and signal values, second digital processing circuitry comprising second programmable digital circuitry for generating control signals corresponding to predetermined sequences of said arithmetic instructions, second bus circuitry connected to said second programmable circuitry for carrying said control signals, and second memory circuitry connected to said second bus circuitry for storing control signal program instructions, timing circuitry for timing the operation of said first and second processing circuitries, means for providing a sequence of time-limited handshakes between said first and second processing circuitries, during which said control signals are transferred to said first processing circuitry to cause said first programmable digital circuitry to carry out said predetermined sequences of said arithmetic instructions, and data sampling means for sampling said received modulated carrier signal at successive instants of time, said first processing circuitry further comprising timing recovery means for controlling the selection of said instants of time, said timing recovery means comprising means for generating a timing recovery error signal for transfer to said second processing circuitry during one of said handshakes, said second processing circuitry comprising means responsive to said error signal to select said instants of time.

13. Modem apparatus in which a modulated carrier signal represents digital bits, wherein said apparatus comprises, first digital processing circuitry comprising first programmable digital circuitry for arithmetic manipulation of digital values in accordance with selectable arithmetic program instructions to produce a correspondence between a sequence of signal values at a rate of 1/T signal values per second and a sequence of samples at a rate higher than 1/T samples per second representing said modulated carrier signal, where T represents the duration of a modulation period of said carrier signal, said first programmable circuitry comprising circuitry for generating said sequence of signal values based upon said modulated carrier signal, as received, to produce said correspondence, first bus circuitry connected to said programmable digital circuitry for carrying said digital values and said arithmetic program instructions, and first memory circuitry connected to said bus circuitry for storing said instructions, digital values, and signal values, second digital processing circuitry comprising second programmable digital circuitry for producing a correspondence between said signal values and bit values representing those signal values, second bus circuitry connected to said second programmable circuitry for carrying said signal values, and second memory circuitry connected to said second bus circuitry for storing a table of correspondence between said signal values and said bit values, timing circuitry for timing the operation of said first and second processing circuitries, means for providing a sequence of time-limited handshakes between said first and second processing circuitries, during which said signal values are transferred between said first and second processing circuitries, and data sampling means for sampling said received modulated carrier signal at successive instants of time, said first processing circuitry further comprising timing recovery means for controlling the selection of said instants of time, said timing recovery means comprising means for generating a timing recovery error signal for transfer to said second processing circuitry during one of said handshakes, said second processing circuitry comprising means responsive to said error signal to select said instants of time.

* * * * *

UNITED STATES PATENT AND TRADEMARK OFFICE
CERTIFICATE OF CORRECTION

PATENT NO. : 4,455,661

DATED : June 19, 1984

INVENTOR(S) : Shahid U. H. Qureshi

It is certified that error appears in the above-identified patent and that said Letters Patent are hereby corrected as shown below:

Under "Other Publications", "Bulyanov et al." should be --Bulyanov, V. F.--

Col. 2, line 15, "signal", should be --signal;--

Col. 2, line 22, "in error signal" should be --an error signal--

Col. 7, line 60, in the table:

" $T_c^m = c^{m-1} = TK3 \, \hat{T}_e^m$ "  should be

-- $T_c^m = T_c^{m-1} = TK3 \, \hat{T}_e^m$ --

Col. 8, line 26, "$y^m$" should be --$\hat{y}^m$--.

Col. 8, line 39, in the formula, the second equal sign should be -- + --

UNITED STATES PATENT AND TRADEMARK OFFICE
CERTIFICATE OF CORRECTION

PATENT NO. : 4,455,661

DATED : June 19, 1984

INVENTOR(S) : Shahid U. H. Qureshi

It is certified that error appears in the above-identified patent and that said Letters Patent are hereby corrected as shown below:

Col. 9, line 41, "cnstant" should be --constant--

Col. 10, line 32, in the formula, second line, the arrow going up should be just a straight line Col. 12, line 17, "r10" should be --$\hat{r}10$--

Col. 12, line 18, "r4" should be --$\hat{r}4$--

Col. 12, line 34, "r" should be --$\hat{r}$--

Signed and Sealed this

Ninth Day of April 1985

[SEAL]

Attest:

DONALD J. QUIGG

Attesting Officer     Acting Commissioner of Patents and Trademarks